US006231895B1

(12) United States Patent
Emanuele et al.

(10) Patent No.: US 6,231,895 B1
(45) Date of Patent: May 15, 2001

(54) FEEDSTOCK FOR RUMINANTS WITH CONTROLLED-RELEASE NON-PROTEIN NITROGEN

(75) Inventors: Stephen M. Emanuele, Clifton Park; Douglas Merrill, Baldwinsville, both of NY (US); Robert J. Petcavich, Del Mar, CA (US); Robert H. Stock, Manlius, NY (US); Xiaoming Yang, San Diego, CA (US)

(73) Assignee: Agway, INC, Dewitt, NY (US)

( * ) Notice: Subject to any disclaimer, the term of this patent is extended or adjusted under 35 U.S.C. 154(b) by 0 days.

(21) Appl. No.: 09/516,957

(22) Filed: Mar. 1, 2000

(51) Int. Cl.$^7$ ........................................ A23K 1/22
(52) U.S. Cl. .................. 426/2; 426/289; 426/69; 426/656; 426/658; 426/635; 426/807
(58) Field of Search ................. 426/2, 807, 289, 426/658, 656, 635, 69

(56) References Cited

U.S. PATENT DOCUMENTS

| | | | | |
|---|---|---|---|---|
| 3,413,118 | * | 11/1968 | Kviesitis | 99/6 |
| 3,940,493 | * | 2/1976 | Fox | 426/69 |
| 3,988,483 | * | 10/1976 | Deyoe et al. | 426/53 |
| 4,196,194 | * | 4/1980 | Glabe et al. | 424/177 |
| 4,615,891 | * | 10/1986 | Nocek et al. | 426/231 |
| 4,969,947 | * | 11/1990 | Moore | 71/28 |
| 5,803,946 | * | 9/1998 | Petcavich et al. | 71/64.11 |
| 5,851,261 | * | 12/1998 | Marknsch et al. | 71/64.07 |
| 5,925,595 | * | 7/1999 | Seitz et al. | 504/116 |

FOREIGN PATENT DOCUMENTS

| | | | |
|---|---|---|---|
| 2100017 | * | 12/1994 | (CA) . |
| 62-125852 | * | 6/1987 | (JP) . |

OTHER PUBLICATIONS

"Some Nutritional Characteristics of Predominant Culturable Ruminal Bacteria", M.P. Bryant and I.M. Robinson, J. Bacteriol., 84, 605–614, (1962)

"Dietary Sodium Bicarbonate and Magnesium Oxide for Early Postpartum Lactating Dairy Cows: Effects on Production, Acid–Base Metabolism, and Digestion", R.A. Erdman, R.W. Hemken, and L.S. Bull, (1982) J. Dairy Sci 65:712–731.

"Polymer Coating on Urea Prills To Reduce Dissolution Rate", J. Agric. Food Chem. Omar A. Salman, 1988, 36, 616–621.

"Dosage De L'Ammoniemie En Discontinu Et En Continu Par Une Technique De Dialyse Automatique", Marc Imler, Alice Frick, Andre Stahl, Bernard Peter Et Jules Stauhl, Clinica Chimica Acta, 37 (1972) pp. 245–261.

"Nitrogen Fractions in Selected Feedstuffs", U. Krisnamoorthy, T.V. Muscato, C. J. Sniffen and P.J. Van Soest, 1982 J. Dairy Sci 65:217–225.

Synchronization of Carbohydrate and Protein Sources on Fermentation and Passage Rates in Dairy Cows[1,2,3], David P. Casper, Harouna A. Maiga, Michael J. Brouk, and David J. Schindoethe, 1999 J. Dairy Sci, 82:1779–1790.

* cited by examiner

Primary Examiner—Chhaya D. Sayala
(74) Attorney, Agent, or Firm—Watov & Kipnes, P.C.

(57) ABSTRACT

This invention provides a ruminant feedstock with a content of non-protein nitrogen supplement which yields a safe controlled-release generation of ammonia under rumen incubation conditions. In another embodiment, this invention provides a ruminant feedstock supplement for controlled-release of non-protein nitrogen which comprises urea particles encapsulated with a rumen-degradable polymeric coating.

17 Claims, No Drawings

FEEDSTOCK FOR RUMINANTS WITH CONTROLLED-RELEASE NON-PROTEIN NITROGEN

BACKGROUND OF THE INVENTION

This invention generally relates to feedstocks for domesticated ruminants. More specifically, this invention relates to the production of cow milk in an increased volume and/or with an enhanced fat content.

Ruminant feeds generally depend on readily fermentable carbohydrates and chopped ensiled forages. This type of feed generates acids in the rumen which are not completely counterbalanced by dietary or endogenous bases and buffers. Under elevated acidic conditions, the population of fiber-digesting rumen microorganisms is less prolific than a population present under more alkaline conditions. When the pH in the rumen tends toward neutral, a lactating ruminant can utilize the higher volatile fatty acid production by the microorganisms to increase the fat content of the milk yield.

It is known that sodium bicarbonate and/or magnesium oxide are effective for increasing the milk and/or milk fat production of ruminants fed high acid-producing diets [J. Dairy Sci., 65, 712 (1982)]. However, these additives can have the undesirable effects of reducing feed intake and decreasing the serum levels of potassium and magnesium.

In another aspect, this invention is concerned with the dietary nitrogen required to support rumen microbial growth, and to satisfy metabolic requirements for protein synthesis. The concentration of rumen ammonia necessary for optimal microbial growth and rumen fermentation in cattle is estimated at about 200 milligrams per liter of rumen fluid. The addition of a source of non-protein nitrogen (NPN) to the diet is beneficial in achieving a favorable equilibrium level of rumen-generated ammonia.

Ruminal bacteria strains such as *Streptococcus bovis* and *Bacteroides succinogenes* are described in J. Bacteriol., 84, 605 (1962).

Publications relating to NPN in feed rations for ruminants include U.S. Pat. Nos. 2,560,830; 2,687,354; 2,748,001; 2,840,473; 2,853,385; 2,861,886; 2,965,488; 3,180,735; 3,259,501; 3,416,928; 3,512,986; 3,523,798; 3,551,162; 3,576,642; 3,600,188; 3,635,725; 3,642,489; 3,653,909; 3,677,767; 3,684,518; 3,733,203; 3,852,498; 3,873,728; 3,873,733; 3,937,846; 3,988,483; 4,027,043; 4,044,156; 4,089,980; 4,186,213; 4,194,012; 4,232,046; 4,376,790; 5,733,590; and the like, incorporated by reference.

Ruminants have the unique ability to convert NPN to animal protein. The microbial flora in the rumen degrade NPN to ammonia, which is then converted to protein. The most widely used NPN source in ruminant feed is urea. However, there are major problems associated with the use of urea in ruminant feed. Enzymatic breakdown of urea to ammonia often occurs faster than the microbial uptake of the liberated ammonia. The excess ammonia thus produced can reach toxic levels in the ruminant, and may lead to severe disability. Much of the excess ammonia is absorbed in the animal's bloodstream, and then is converted back to urea in the liver and excreted. The lost ammonia is not utilized for protein synthesis, which results in a less efficient utilization of available nitrogen.

A broad range of research has been directed to means for controlling the rate of NPN fermentation in the rumen, and the resultant equilibrium level of ammonia in the rumen. A NPN source such as urea typically has been physically blended with various saccharides such as starch or molasses, or chemically bound to saccharides, to produce slow-release NPN formulations which do not have a satisfactory combination of properties for purposes of ruminant nutrition and productivity. The release rate is too high for the physically blended NPN, and too slow for the chemically bound NPN.

There is continuing interest in the development of new and improved feedstocks and methods for efficient ruminant management, and the provision of value-added meat and dairy products.

Accordingly, it is an object of the invention to provide an improved NPN feedstock supplement for enhanced rumen health and increased microbial population in ruminants.

It is another object of this invention to provide a ruminant feedstock which has a content of improved NPN supplement.

It is another object of this invention to provide a method for increasing the milk production of dairy cattle.

It is another object of this invention to provide a method for enhancing the fat content of cattle milk production.

It is a further object of this invention to provide a method for increasing the efficiency of feedstock utilization by ruminants, and for decreasing the relative volume of manure accumulation.

Other objects and advantages of the present invention shall become apparent from the accompanying description and examples.

Of related interest with respect to the present invention, are publications which include J. Anim. Sci., 67, 820 (1989), and U.S. Pat. Nos. 3,413,118; 3,843,799; 4,118,513; 4,196, 194; 4,857,332; and 5,803,946; incorporated by reference.

DESCRIPTION OF THE INVENTION

One or more objects of the present invention are accomplished by a feedstock for ruminants which comprises (1) nutritionally balanced ration; (2) controlled-release non-protein nitrogen composition in an effective quantity sufficient to generate and maintain an equilibrium quantity between about 6–18 milligrams of ammonia per deciliter of rumen fluid on a continuous daily basis during a feeding regimen; and (3) at least about 0.8 part by weight of rumen-available carbohydrate per part by weight of rumen-available nitrogen source for microbial protein formation.

A present invention feedstock is especially suitable for domesticated ruminants such as sheep, beef cattle, and dairy cattle.

The controlled-release non-protein nitrogen composition is blended as a supplement with nutritionally balanced ration to provide a present invention feedstock. Typical basal rations are described in publications such as J. Dairy Sci., 77, 1437 (1994); 77, 1661 (1994); and 77, 3096 (1994); and U.S. Pat. Nos. 3,778,508; 4,196,194; 4,615,891; and 4,857, 332; incorporated by reference.

The term "rumen-available carbohydrate" as employed herein refers to non-fibrous saccharidic compounds such as monosaccharides, disaccharides, and polysaccharides. Readily digestible carbohydrates include glucose, fructose, sucose, and the like, as exemplified by nutrient sources such as molasses, cornstarch, and whey.

The non-protein nitrogen ingredient is incorporated in an invention feedstock in a quantity between about 0.25–15 weight percent of the dry matter. Typically between about 1–8 parts by weight of rumen-available carbohydrate is included to counterbalance the content of non-protein nitrogen in the feedstock. The rumen-available carbohydrate is an essential readily digestible ingredient which provides available carbon structures for reaction with ammonia in the rumen to form microbial protein.

In another embodiment this invention provides a feedstock for ruminants which comprises (1) nutritionally balanced diet ration; (2) controlled-release non-protein nitrogen composition in an effective quantity sufficient to generate and maintain an equilibrium quantity between about 6–18 milligrams of ammonia per deciliter of rumen fluid on a continuous daily basis during a feeding regimen, wherein the controlled-release composition comprises non-protein nitrogen particles encapsulated with a rumen-degradable polymeric coating; and (3) between about 1–8 parts by weight of rumen-available carbohydrate per part by weight of rumen-available nitrogen source for microbial formation.

An invention feedstock can be rationed to ruminants such as dairy cattle in a quantity which provides between about 0.2–1 pound per day of non-protein nitrogen composition per animal. The NPN supplemented feedstock preferably has a bulk content of forage and soybean meal.

Suitable non-protein nitrogen sources include urea, biuret, ethylene urea, isobutane diurea, melamine, dicyanodiamide, acetamide, butyramide, ammonium salts of acids such as phosphoric, carbonic, hydrochloric, sulfuric, carbamic, citric, formic, acetic, propionic, lactic, succinic, fumaric, malic, and the like. Non-protein nitrogen ingredients for animal feeds are described in publications which include U.S. Pat. Nos. 3,653,909; 3,988,483; and 4,232,046; incorporated by reference.

A controlled-release non-protein nitrogen composition of the present invention usually is in the form of free-flowing particles. The size of the composition particles typically can be in the range between about 0.5–8 millimeters in diameter, and preferably in the range between about 2–5 millimeters.

In a preferred embodiment the particulate non-protein nitrogen composition comprises particles with a NPN core matrix which is encapsulated with a water-insoluble biodegradable coating.

J. Agric. Food Chem., 36, 616 (1988) describes a fluidized bed process for encapsulating urea prills with a coating of a polymer such as polystyrene, polycarbonate, vinyl chloride/vinyl acetate copolymer, or polyvinyl acetate.

U.S. Pat. No. 3,413,118 describes a livestock feed containing a non-protein nitrogen compound selected from urea and ammonium salts. The non-protein nitrogen compound is in the form of particles coated with an emulsion comprised of propylene glycol, vegetable oil, vegetable wax and lecithin, and a quantity of a palatability increasing agent which is absorbed in the coating.

U.S. Pat. No. 5,803,946 describes the development of a coated urea product which has utility as a controlled-release fertilizer. Particulate urea is coated with a water-insoluble biodegradable interpenetrating polymer network comprised of biuret, urethane, and tung oil linkages.

The U.S. Pat. No. 5,803,946 controlled-release product is pertinent for purposes of the present invention since the controlled-release plant nutrient technology can be extended to non-protein nitrogen products suitable as feed supplements for sheep, beef cattle, dairy cattle, and other ruminants.

In a further embodiment, this invention provides a feedstock for increasing the fat yield of milk production by lactating dairy cattle which comprises (1) nutritionally balanced dairy ration; (2) controlled-release non-protein nitrogen composition in an effective quantity sufficient to generate and maintain an equilibrium quantity between about 6–18 milligrams of ammonia per deciliter of rumen fluid on a continuous daily basis during a feeding regimen, wherein the controlled-release composition comprises urea particles encapsulated with a rumen-degradable polymeric coating; and (3) between about 1–8 parts by weight of rumen-available carbohydrate per part by weight of rumen-available nitrogen source for microbial formation.

A present invention type of coated urea product suitable as a controlled-release non-protein nitrogen feed supplement for sheep, beef cattle, and dairy cattle can be manufactured by first creating a mobile mass of particulates in any one of a variety of devices including rotary drums, fluidized beds, rotary pans, falling film contactors, conical blenders, and agitated conveyers. The devices impart mobility to the particles and induce a rolling or tumbling movement of the particles in the mass, so that the surfaces of the particles are at least periodically exposed for topical application thereto of a material (e.g., a coating medium) which may be applied to the particles in liquid or powder form by pouring, spraying or mixing.

The mobile mass of particles then is treated with a polyfunctional isocyanate which reacts with the urea on the surface of the particles to form a biuret, i.e., a condensation product of urea with isocyanate:

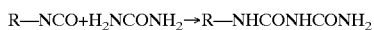

The reaction allows the isocyanate group to form a chemical bond on the urea surface. This reaction increases adhesion between the coating and the particulate urea core and provides a first water barrier on the urea core surface.

The amount of polyisocyanate applied to the particles is in excess of that required to react with the urea-containing surfaces of the particles. The excess is sufficient to support a secondary reaction, and preferably is in the order of about 5–10 times the amount required to transform the surface of the particles into a biuret. A polyfunctional isocyanate suitable as a reactant is dephenylmethane diisocyanate (MDI) having more than two functional groups, preferably PAPI™ 2027 polymeric MDI from The Dow Chemical Co., or Rubinate™ M polymeric MDI from ICI Polyurethanes. Other acceptable isocyanates are aliphatic or aromatic, linear or branch, substituted or non-substituted, saturated or nonsaturated isocyanates with more than two isocyanate functional groups. The Rubinate™ M polymeric MDI has a functionality of approximately 2.7 and an NCO content of approximately 31.5%.

A mixture of an alkyd resin having double bonds, an oil having double bonds, and an initiator is then applied to the mobile mass of particles or granules. The mixture optionally may include a promoter and/or a diluent or solvent. The preferred oil is dehydrated castor oil.

The coating mixture of alkyd resin, oil, initiator, and optional promotor and/or solvent starts to cure immediately upon application to the granules. The excess of isocyanate applied to the granules in the first coating step or stage reacts with the —OH and —COOH in the alkyd resin and the —COOH in the dehydrated castor oil.

Free radical polymerization of the alkyd resin and the oil take place simultaneously with the condensation polymerization of the excess isocyanate, alkyd resin and oil. The double bonds in the alkyd resin can also react with the double bonds in the dehydrated castor oil, thereby forming an integrated interpenetrating polymer network coating on the particles, wherein all of the constituents, including the oil, are chemically bonded together and to the particle urea cores.

A suitable alkyd resin is Dynotal™ T-39-EMP from Cytec Industries, Inc., West Paterson, N.J. The resin contains 15–25% of ethanol and 1-methoxy-2-propanol. The acid value in mg KOH/g solids is 8–30, the HO-value in mg KOH/g solids is 155–160, and the viscosity at 23° C. is 2500–3500 mpas. Alkyd resins having a higher viscosity, e.g., 3500–9000 mPas at 23° C., can be employed to impart enhanced physical properties to the coating, such as film tensile strength. One example is Dynotal™ T-49-EMP with a viscosity of 6000–9000 mPas at 23° C. Use of resins of very high viscosity usually will require a diluent or solvent to reduce viscosity during application of the coating mixture to the granules.

Oils other than dehydrated castor oil, having conjugated double bonds reactive with the double bonds in the alkyd resin, also can be employed (e.g., tung oil and linseed oil). Dehydrated castor oil is preferred because it is nontoxic and safe for consumption by animals, it dries rapidly at room temperature, and its long chain hydrocarbon backbone imparts flexibility to the coating.

An initiator is employed in the alkyd resin/oil mixture to initiate free radical polymerization of the mixture. A polymerization promoter is a preferred constituent of the coating mixture to increase the speed of the reactions and thereby minimize the coating cure time. The initiator may be selected from ketone peroxides, such as methyl ethyl ketone peroxide, benzoyl peroxide, and cumene hydroperoxide. The promoter may be a metal or metal compound, such as cobalt or vanadium.

Depending upon the viscosity of the second stage coating mixture, a diluent or solvent may be required. For example, if the second stage mixture is applied hot, e.g., at a temperature of up to about but not in excess of 50° C. (122° F.), the viscosity can be controlled solely by adjustment of the temperature of application. If the second stage mixture is not heated or not sufficiently heated, or viscosity cannot be reduced by heat alone, a solvent selected from glycol ethers (such as propylene glycol methyl ether acetate), ketones (such as methyl ethyl ketone) and aromatic hydrocarbons may be added to the mixture in an amount sufficient to reduce the viscosity to the desired consistency for application to the mobile mass of granules or particles.

In a specific embodiment, urea or urea-bearing granules or particles are fed to a coater and dried for about 10 minutes at 35°–100° C. (95°–212° F.). Liquid isocyanate is then applied to the mobile mass of particles in an amount that is about 5–10 times in excess of that required for the reaction between the isocyanate and the urea, and held for a residence time of about 5 minutes to coat the particles uniformly and to permit the isocyanate/urea reaction to be completed. A liquid mixture of alkyd resin, dehydrated castor oil, initiator and optional promoter and/or solvent is then applied to the particles. To expedite the reactions and hasten the cure time, the particles and the coating constituents are preferably heated to and/or maintained at an elevated temperature in the order of about 60°–100° C. At a temperature of 100° C., and with effective proportions of the initiator and promoter, cure times are in the order of 5–10 minutes.

The proportions of the constituents applied to the non-protein nitrogen particles to form the interpenetrating polymer network coating are preferably in the order of about 15–65% by weight of the isocyanate, about 20–60% by weight of the alkyd resin, about 5–35% by weight of the oil, and about 0.2–10% by weight of initiator and promoter. If required, a solvent may be used in a proportion of up to about 40%.

More preferred ranges of the constituents are 25–55% by weight of isocyanate, 25–60% by weight of alkyd resin, 5–25% by weight of dehydrated castor oil, 0.2–6% of initiator and 3–35% of solvent. The ratio of alkyd resin to oil is preferably within the range between about 7:5 to 9:1. For low viscosity resins, e.g., Dynotal™ T-39-EMP, the preferred ranges of the constituents are 30–55% by weight of isocyanate, 35–55% by weight of alkyd resin, 5–20% by weight of dehydrated castor oil, 3–6% of initiator and 3–6% of solvent.

The polymer network forming ingredients may be applied to the nutrient particles in coat weight amounts between about 1.5–5 weight percent of the NPN particles. After the polymer network has cured, as appropriate, the particles can be overcoated with paraffin wax in an amount between about 0.5–2 weight percent of the coated NPN particles.

In a preferred and more specifically defined embodiment, this invention provides a ruminant feedstock supplement for controlled-release of non-protein nitrogen which comprises urea particles encapsulated with a rumen-degradable polymeric coating, wherein the polymeric coating comprises a network of molecules crosslinked with biuret and urethane radicals derived from polyisocyanate selected from the group consisting of aliphatic and alicyclic reactants.

An important aspect of the present invention is the development of Optigen™ 1200, which is manufactured and sold by CPG Nutrients (division of Agway, Inc., Syracuse, N.Y.) as a controlled-release non-protein nitrogen feed supplement for ruminants.

A process for producing Optigen™ 1200 is illustrated in Example I. It is noteworthy that hexamethylene diisocyanate is utilized as the polyisocyanate reactant in the urea particle coating system. The metabolic byproducts of hexamethylene diisocyanate are more safely digestible than those of a polyisocyanate such as diphenylmethane diisocyanate. Preferred polyisocyanates are aliphatic and alicyclic compounds such as hexamethylene diisocyanate and cyclohexylene diisocyanate.

An invention NPN supplement for ruminant rations such as Optigen™ 1200 has manifold advantages when incorporated in a feeding regimen for lactating dairy cattle. Typical advantages include:

(1) the amount of supplemental protein in the ration can be reduced (e.g., soybean meal);

(2) more space is created in the ration for homegrown forages, and utilization of lower quality forages is promoted;

(3) the volume of cattle manure is lessened, and the nitrogen content of the accumulated manure output is minimized;

(4) the ruminal digestive profile of the NPN is similar to soybean meal, which provides the optimum rate of ammonia generation for efficient microbial growth;

(5) a high level of NPN can be fed without a detrimental ammonia toxicity;

(6) the levels of BUN (blood urea nitrogen) and MUN (milk urea nitrogen) are not increased;

(7) milk production is increased;

(8) the milk fat content of milk product is increased;

(9) the population of rumen microorganism is increased; and/or

(10) the efficiency of rumen microorganisms is increased.

The following examples are further illustrative of the present invention. The components and specific ingredients are presented as being typical, and various modifications can be derived in view of the foregoing disclosure within the scope of the invention.

Ammonia content in ruminal fluid can be monitored by following the sampling procedures described in J. Anim. Sci., 67; 820 (1980) and Clin. Chim. Acta, 37, 245 (1972).

EXAMPLE I

This Example illustrates the production of controlled-release non-protein nitrogen compositions in accordance with the present invention.

The following standard operating procedure was employed for production of about 3680 pounds of Optigen™ 1200 (CPG Nutrients, division of Agway, Inc.).

| | Primer Formulation | |
|---|---|---|
| 1. | Desmodur 3300 (Hexamethylene diisocyanate; Bayer) | 112 pounds |
| 2. | T-12 Catalyst (promoter; Air Products) | 50 grams |

The two ingredients were charged to a heating drum and heated to 110°–115° F. The admixture was transferred to a spray vessel, and heated to 120°–125° F. before the spraying cycle.

| | Resin Formulation | |
|---|---|---|
| 1. | Dynatol T-39 (alkyd resin; Cytec) | 50 pounds |
| 2. | Tung Oil (Alnor Oil Company) | 24 pounds |
| 3. | Lupersol (2-butanone peroxide initiator; Aldrich) | 6 pounds |
| 4. | T-12 Catalyst | 150 grams |

The ingredients were charged to a heating drum and heated to 110°–115° F. The admixture was transferred to a spray vessel, and heated to 120°–125° F. before the spraying cycle.

A 4000 pound batch of particulate urea (average diameter of about 1.5 millimeters; C-F Industries, Long Grove, Ill.) was charged to a first heating drum, and the batch was heated to 90°–100° F. The heated urea then was transferred by conveyor to a rotary blender (Rollomixer, Model FP; Continental Products Corp., Milwaukee). Primer formulation was sprayed on the moving urea mass over a period of about 3 minutes.

After an elapsed period of 15 minutes, the resin formulation was sprayed on the primer-coated urea over a period of about 3 minutes. The coated urea was held in the rotary blender for an additional 8 minute period, and then transferred to a surge bin.

The coated urea in the surge bin was heated at a temperature of 90°–120° F., and then transferred to a second heating drum. The residence time in the heating drum (90°–145° F.) was about 17 minutes.

The coated urea then was transported by conveyer to a cooling drum, and maintained at a temperature of 60°–90° F. for about 10 minutes. The coated urea from the cooling drum was screened, and transferred to a bulk storage area for packing as Optigen™ 1200.

Similar non-protein nitrogen supplements are produced employing the same operating procedure with particulate NPN compounds such as biuret, melamine, acetamide, ammonium chloride, ammonium phosphate, ammonium carbonate, ammonium acetate, and ammonium citrate.

The Optigen™ 1200 product of the process consisted of free-flowing white beads (average diameter of about 2 millimeters), which had a bulk density of 43 pounds per cubic foot.

EXAMPLE II

This Example illustrates the beneficial controlled-release properties of a coated non-protein nitrogen composition in accordance with the present invention.

Three criteria were utilized to demonstrate the controlled-release properties of Optigen™ 1200 in comparison with urea and soybean meal. These criteria were (1) the solubility of nitrogen source in borate phosphate buffer at a pH of 6.8; (2) in vitro ammonia production during fermentation with rumen bacteria; and (3) in vivo dry matter and protein disappearance in the rumen.

(1) Solubility In Borate Phosphate Buffer

Twenty grams of either feed grade urea, soybean meal or Optigen™ 1200 were placed in 100 ml of borate phosphate buffer solution at a pH of 6.8. Flasks containing the buffer and protein supplements were manually stirred and placed in a water bath at 39° C. After 15 minutes in the water bath, flasks were manually stirred and removed from the water bath. Contents of the flasks were filtered through Whatman #4 filter paper. The ammonia nitrogen content of the filtered liquid was measured using urea nitrogen kit #640 from Sigma Diagnostics, which employs enzymatic and calorimetric means. Urease enzyme converts soluble urea nitrogen into ammonia nitrogen. The ammonia nitrogen concentration is calculated by measuring the absorbance of a sample on a spectrophotometer at a wavelength of 570 nm. The relationship between ammonia nitrogen concentration and absorbance is linear up to a concentration of 75 mg/dl. The equation to calculate ammonia nitrogen concentration from sample absorbance was generated from 7 ammonia nitrogen standards. These standards were 0, 5, 15, 30, 45, 60 and 75 mg/dl of ammonia nitrogen. Solubility was measured as ammonia concentration (mg/dl) in the filtered liquid sample. Values obtained with this methodology were compared to solubility values obtained on samples of feed grade urea, soybean meal and Optigen™ 1200 sent to the Dairy One Forage laboratory (Ithaca, N.Y.).

The amount of NPN added to each flask for the solubility measurements are listed in Table 1. Soybean meal contains a much smaller percentage of total nitrogen as NPN compared with feed grade urea and Optigen™ 1200. For this reason, solubility measurements are expressed on a percent of total nitrogen basis.

TABLE 1

| | PROTEIN SUPPLEMENTS | | |
|---|---|---|---|
| Feed | Percent Total Nitrogen (as fed basis) | Percent of Total Nitrogen as $NPN_1$ | Grams of NPN Added per Flask for Solubility Measurement |
| Feed Grade Urea | 45.0 | 100 | 9.00 |
| Optigen 1200 | 43.2 | 100 | 8.64 |
| Soybean meal | 8.16 | 11.3 | 0.184 |

[1]Soybean meal, calculated in accordance with J. Dairy Sci., 65, 217 (1982).

(2) In Vitro Rumen Microbial Fermentation

Rumen fluid was collected from a fistulated Holstein cow by squeezing rumen digesta through 6 layers of cheese cloth.

The rumen fluid was collected in an insulated thermos that had been warmed to 39° C. After approximately 2 liters of rumen fluid had been collected, carbon dioxide gas was pumped into the thermos to remove any oxygen. The rumen fluid was strained through 8 layers of cheesecloth and mixed with buffer solution while carbon dioxide was bubbled into the mixture. The mixture of rumen fluid and buffer consisted of 100 ml of rumen fluid and 300 ml of buffer. The mixture of rumen fluid and buffer was heated to 39° C. by placing the jars in an oven specifically designed to heat and rotate the jars.

Samples were formulated to contain 35–36% non-fiber carbohydrate on an as fed basis. The protein sources for the samples were either Optigen™ 1200, feed grade urea containing 46% nitrogen, or soybean meal containing 48% crude protein on an as fed basis. The carbohydrate source for the in vitro fermentation was Westway Sweet Lac Lactation supplement. This supplement provided a mixture of digestible fiber from beet pulp, easily digested rumen-available carbohydrates, animal fat, calcium, phosphorus and yeast culture. This carbohydrate source was selected because it was readily fermented during the short in vitro rumen fermentation period, and it stimulated microbial growth. The feed grade urea and Optigen™ 1200 treatments were isonitrogenous. The soybean meal treatment was not isonitrogenous with the other treatments. The compositions are summarized in Table 2.

TABLE 2

COMPOSITION OF SAMPLES

| Composition | Soybean Meal | Feed Grade Urea | Optigen 1200 |
|---|---|---|---|
| Feed Grade Urea | 0 | 42% | 0 |
| Optigen 1200 | 0 | 0 | 44% |
| Soybean meal | 65% | 0 | 0 |
| Sweet Lac | 35% | 58% | 56% |

A 15 gram quantity of each composition was mixed with 150 ml of the rumen fluid and buffer mixture in a 250-ml flask. Flasks were manually stirred and sealed with a rubber stopper. Flasks were placed in an incubator at 39° C., and the flasks were manually stirred every two hours. At each time point there were 9 flasks. Three flasks contained the sample treatment plus rumen fluid with buffer. Three flasks contained only rumen fluid with buffer. The remaining three flasks contained only Sweet Lac and rumen fluid with buffer.

Flasks were removed from the incubator at time points 0, 2, 4, 6, 16, 18, 20 and 24 hours. After removal from the incubator, the contents of each flask were filtered through Whatman #4 filter paper into 50-ml centrifuge tubes. The centrifuge tubes were sealed via screw caps. The contents of each centrifuge tube were transferred into a syringe, which was attached to a Millipore filter disk. The sample was forced under pressure through the Millipore filter disk into a 15-ml centrifuge tube. The 15-ml centrifuge tube was sealed via a screw top. Samples that were analyzed the same day were not acidified with sulfuric acid. Samples that were stored over night were acidified with 0.25 ml of concentrated sulfuric acid and placed in a refrigerator at 42° F.

All samples were analyzed for ammonia nitrogen using ammonia nitrogen kit #640 from Sigma Diagnostics. Ammonia nitrogen concentration of each sample was corrected for the baseline ammonia concentration measured in the flasks containing only rumen fluid with buffer.

(3) In Vivo Dry Matter and Protein Disappearance

Samples of feed grade urea, soybean meal and Optigen™ 1200 respectively were placed in nylon bags. Sample size was adjusted so that the sample to bag surface area ratio was similar for all protein sources. The nylon bags with samples were suspended in the rumen of a fistulated cow. There were two bags per time point and three replications. Time points for bag incubation were 0, 3, 6, 12, 16, 24, 32 and 36 hours. When the nylon bags were removed from the rumen, they were washed with distilled water. The bags were washed till the rinse water was clear. The bags were dried in a forced air oven at 60° C. Composite samples were prepared by time point and sent to the Dairy One Forage laboratory for crude protein analysis. Dry matter and crude protein disappearance was calculated by the following formulas:

$$\text{Dry Matter Disappearance \%} = \frac{\text{Initial Sample Weight} - \text{Residue Weight}}{\text{Initial Sample Weight}} \times 100$$

$$\text{Protein Disappearance \%} = \frac{\text{Initial Protein Content in Sample} - \text{Protein Content of Bag Residue}}{\text{Initial Protein Content in Sample}} \times 100$$

Data was analyzed using a nonlinear model in SAS.

Data Evaluation (1) Solubility in borate phosphate buffer at pH 6.8 indicated that Optigen™ 1200 has a protein solubility which is similar to soybean meal but much lower than urea. The protein solubility of Optigen™ 1200 varies between 10 and 26%. This is similar to the values for soybean reported in the literature. The protein solubility of soybean meal varies between 18 and 28%. Compared to a feed grade urea, Optigen™ 1200 is relatively insoluble in borate phosphate buffer. Optigen™ 1200 is a superior source of rumen-degradable protein. Greater than 90% of the Optigen™ 1200 protein can be classified as rumen-degradable protein in comparison to other nitrogen sources (DM basis):

| Feed | Total Nitrogen (%) | Degradable Nitrogen, % of Total N | Soluble Nitrogen, % of Total N | Rumen Undegradable Nitrogen, % of Total Nitrogen |
|---|---|---|---|---|
| Optigen ™ 1200 | 43.2 | 93 | 10–26 | 7 |
| Feed Grade Urea | 46 | 100 | 100 | 0 |
| Alfalfa Silage | 2.9–3.4 | 85 | 50–60 | 15 . 18 |
| Soybean Meal | 8.6 | 70–75 | 18–28 | 5 |

(2) The amount of nitrogen and carbohydrate that was added to the in vitro fermentation flasks containing either feed grade urea or Optigen™ 1200 were similar. Differences in ammonia concentration during the fermentation were due to differences in the rate of ammonia production. In vitro ammonia production when Optigen™ 1200 and urea were incubated with rumen bacteria demonstrated that Optigen™ 1200 had a much slower rate of ammonia production as compared to urea. The urea was rapidly hydrolyzed to ammonia. After two hours of fermentation, the ammonia concentration was 1559.4 mg/dl of rumen fluid when urea was the nitrogen source. By comparison, after 2 hours of fermentation the ammonia concentration was 117 mg/dl of rumen fluid when Optigen™ 1200 was the nitrogen source. When urea was the nitrogen source, ammonia concentration reached a peak by 2 hours of incubation time. When Optigen™ 1200 was the nitrogen source, ammonia concentration increased gradually during the fermentation and did not reach a peak till 20 hours of incubation time.

The data demonstrated that the rate of nitrogen degradation is different between urea and Optigen™ 1200. The pattern of nitrogen degradation observed with Optigen™ 1200 also is different from other "slow-release" nitrogen supplements. It was reported in J. Anim. Sci., 48 (4), 887 (1979) that in vitro release of ammonia from urea, and from a gelatinized starch/urea, was rapid. In these products, 80% of the total nitrogen was converted to ammonia within two hours of incubation.

The total amount of nitrogen in the Optigen™ 1200 in vitro fermentation was 2.96 grams. This was obtained by multiplying the 15 grams of protein and carbohydrate sample by 123.3% crude protein content and dividing by 6.25. At two hours of incubation, the ammonia concentration in the fermentation flasks was 117 mg/dl. Since the flasks contained 1.5 dl, the total amount of ammonia nitrogen in solution was 117×1.5=175.5 mg. This represents 5.9% of the total nitrogen in the flask. The degradation of the nitrogen in Optigen™ 1200 to ammonia occurred at a much slower rate compared to other "slow-release" nitrogen supplements. Experiments in J. Anim. Sci., 50, 527 (1980) compared a "slow-release" urea supplement with prilled feed grade urea. The data indicated that the ammonia concentration in cattle rumen was 53 mg/dl with prilled urea, and 32 mg/dl with the "slow-release" urea. This represented a 40% reduction of rumen ammonia. In accordance with the present invention ammonia concentration at 3 hours of incubation was reduced by 68% when Optigen™ 1200 replaced urea as the NPN supplement. The present invention has demonstrated that Optigen™ 1200 differs from previously developed "slow-release" urea NPN supplements.

(3) In vivo dry matter and protein digestion of Optigen™ 1200 followed a pattern which was much closer to soybean meal than urea. The dry matter digestion of Optigen™ 1200 was significantly different from feed grade urea. The digestion of urea followed a linear pattern while the digestion of Optigen™ 1200 followed a $2^{nd}$ order polynomial pattern. This indicated that there was one digestion rate of urea, which was very rapid, and that there were two different digestion rates for Optigen™ 1200. Optigen™ 1200 had an intermediate digestion rate during the first 16 hours of rumen fermentation. This was followed by a slow digestion rate from 16 to 24 hours. This polynomial digestion pattern was similar to the pattern observed for soybean meal. During the first 3 hours of fermentation, Optigen™ 1200 had a faster rate of digestion than soybean meal, but had a slower rate of digestion between 3 and 12 hours of fermentation. This demonstrated that Optigen™ 1200 is a controlled-release source of NPN, since typical NPN compounds like urea have a digestion rate that is much faster than soybean meal.

The risk of ammonia toxicity from Optigen™ 1200 appears to be low. Optigen™ 1200 has been fed to lactating dairy cows at rates of 0.75 and 1.0 pound per day for 30 per day. If urea were fed at rates of 0.75 and 1.0 pound per cow per day, the cows would be susceptible to ammonia toxicity. The safety of Optigen™ 1200 is attributable to its controlled-release of nitrogen in the rumen. Soybean meal and Optigen™ 1200 reach the same in vivo extent of digestion after 24 hours of rumen incubation. For Optigen™ 1200 to be an effective source of rumen degradable protein for dairy cattle, it must be extensively degraded in the rumen within 12 hours. The passage rate of digesta out of the rumen will vary with the level of feed intake. For high producing dairy cows, the passage rate of digesta out of the rumen has been estimated at 8% per hour (AFRC 1993). This would imply that rumen turn over would occur every 12.5 hours. It is reported in J. Dairy Sci., 82, 1779 (1999) that the fractional passage of solid digesta from the rumen of lactating dairy cows varied from 3.4 to 4.2% per hour. At these passage rates, the mean retention time in the rumen for total mixed diets containing barley, corn and soybean meal were 24.5 to 30.5 hours. For Optigen™ 1200 to be an effective source of nitrogen for the rumen bacteria, it must be completely digested within 12 to 24 hours in the rumen. The in vivo dry matter and protein degradation curves for Optigen™ 1200 have indicated that the NPN from Optigen™ 1200 did not pass out of the rumen before being converted to ammonia. By 12 hours of incubation in the rumen, 77% of the nitrogen from Optigen™ 1200 was digested. The completion of both dry matter and protein digestion were reached within 24 hours of rumen incubation. These data demonstrated an advantage over other "slow-release" urea supplements. When acetylurea, biuret and isobutyldiurea were fed to dairy cattle, a substantial part of the NPN in those supplements passed out of the rumen without being broken down to ammonia by rumen bacteria (Tamminga et al. Protein and Non-Protein Nitrogen for Ruminants. Seminar of UNEC for Europe. Pages 9–31,1977; Pergamon Press, N.Y.).

Animal performance data further indicated that Optigen™ 1200 was utilized efficiently for milk production. When Optigen™ 1200 was fed at the rate of 0.5 pound per cow per day, and replaced 1.7 pounds of soybean meal and 0.15 pounds of urea, milk production did not decrease in high producing dairy cows. The trend was for higher milk yield. Cows fed Optigen™ 1200 produced 4.3 pounds more milk than the cows on the control diet (89.0 versus 84.7). This was evidence that Optigen™ 1200 was metabolized with greater efficiency for milk production than urea. Consequentially, a reduced accumulation of cow manure output can be achieved. As a further advantage, the nitrogen content of cow manure can be reduced when Optigen™ 1200 is added to feed ration as a non-protein nitrogen supplement in partial substitution for plant protein in the feed ration.

Optigen™ 1200 also had a beneficial effect on the milk fat yield of milk collected from lactating cattle. Depending on the particular feed regimen, the milk fat yield varied form a small increase to as high as 14%, based on the milk fat content. On milk volume basis, this corresponded to about 4% milk fat in the raw milk product. As an additional benefit, the protein yield of milk production is enhanced. Superior animal performance is achieved when the feedstock content is adjusted as necessary to provide between 6–18 milligrams of ammonia per deciliter of rumen fluid, as determined by rumen fluid monitoring.

What is claimed is:

1. A feedstock for ruminants which comprises (1) nutritionally balanced ration; (2) controlled-release non-protein nitrogen composition in an effective quantity sufficient to generate and maintain an equilibrium quantity between about 6–18 milligrams of ammonia per deciliter of rumen fluid on a continuous daily basis during a feeding regimen; and (3) at least about 0.8 part by weight of rumen-available carbohydrate per part by weight of rumen-available nitrogen source for microbial protein formation.

2. A feedstock in accordance with claim 1 wherein the ruminants are sheep, beef cattle and dairy cattle.

3. A feedstock in accordance with claim 1 wherein the controlled-release non-protein nitrogen composition comprises between about 0.25–15 weight percent of the feedstock dry matter.

4. A feedstock in accordance with claim 1 wherein the non-protein nitrogen composition is selected from the group consisting of urea, biuret, and ammonium salts.

5. A feedstock for ruminants which comprises (1) nutritionally balanced ration; (2) controlled-release non-protein nitrogen composition in an effective quantity sufficient to generate and maintain an equilibrium quantity between about 6–18 milligrams of ammonia per deciliter of rumen fluid on a continuous daily basis during a feeding regimen, wherein the controlled-release composition comprises non-protein nitrogen particles encapsulated with a rumen-degradable polymeric coating; and (3) between about 1–8 parts by weight of rumen-available carbohydrate per part by weight of rumen-available nitrogen source for microbial formation.

6. A feedstock in accordance with claim 5 wherein the non-protein nitrogen composition is selected from the group consisting of urea, biuret, and ammonium salts.

7. A feedstock in accordance with claim 5 wherein the ruminants are sheep, beef cattle and dairy cattle, and the feeding regimen provides between about 0.2–1 pound per day of non-protein nitrogen composition per animal.

8. A feedstock for increasing the fat yield of milk production by lactating dairy cattle which comprises (1) nutritionally balanced dairy ration; (2) controlled-release non-protein nitrogen composition in an effective quantity sufficient to generate and maintain an equilibrium quantity between about 6–18 milligrams of ammonia per deciliter of rumen fluid on a continuous daily basis during a feeding regimen, wherein the controlled-release composition comprises urea particles encapsulated with a rumen-degradable polymeric coating; and (3) between about 1–8 parts by weight of rumen-available carbohydrate per part by weight of rumen-available nitrogen source for microbial formation.

9. A feedstock in accordance with claim 8 which is effective for increasing the daily volume of milk production per cow.

10. A feedstock in accordance with claim 8 which is effective for increasing feed efficiency and reducing the volume of manure output per cow.

11. A feedstock in accordance with claim 8 wherein the rumen-available carbohydrate is selected from the group consisting of monsaccharides, disaccharides, and polysaccharides.

12. A feedstock in accordance with claim 8 wherein the rumen-available carbohydrate comprises molasses.

13. A feedstock in accordance with claim 8 wherein the rumen-available carbohydrate comprises corn starch.

14. A feedstock in accordance with claim 8 wherein the polymeric coating on the urea particles comprises a network of molecules crosslinked with biuret and urethane radicals derived from a polyisocyanate reactant.

15. A feedstock in accordance with claim 14 wherein the polyisocyanate is selected from the group consisting of aliphatic and alicyclic reactants.

16. A feedstock in accordance with claim 14 wherein the polyisocyanate comprises hexamethylene diisocyanate.

17. A feedstock for increasing the protein yield of milk production by lactating dairy cattle which comprises (1) nutritionally balanced dairy ration; (2) controlled-release non-protein nitrogen composition in an effective quantity sufficient to generate and maintain an equilibrium quantity between about 6–18 milligrams of ammonia per deciliter of rumen fluid on a continuous daily basis during a feeding regimen, wherein the controlled-release composition comprises urea particles encapsulated with a rumen-degradable polymeric coating; and (3) between about 1–8 parts by weight of rumen-available carbohydrate per part by weight of rumen-available nitrogen source for microbial formation.

\* \* \* \* \*